United States Patent Office 3,448,975
Patented June 10, 1969

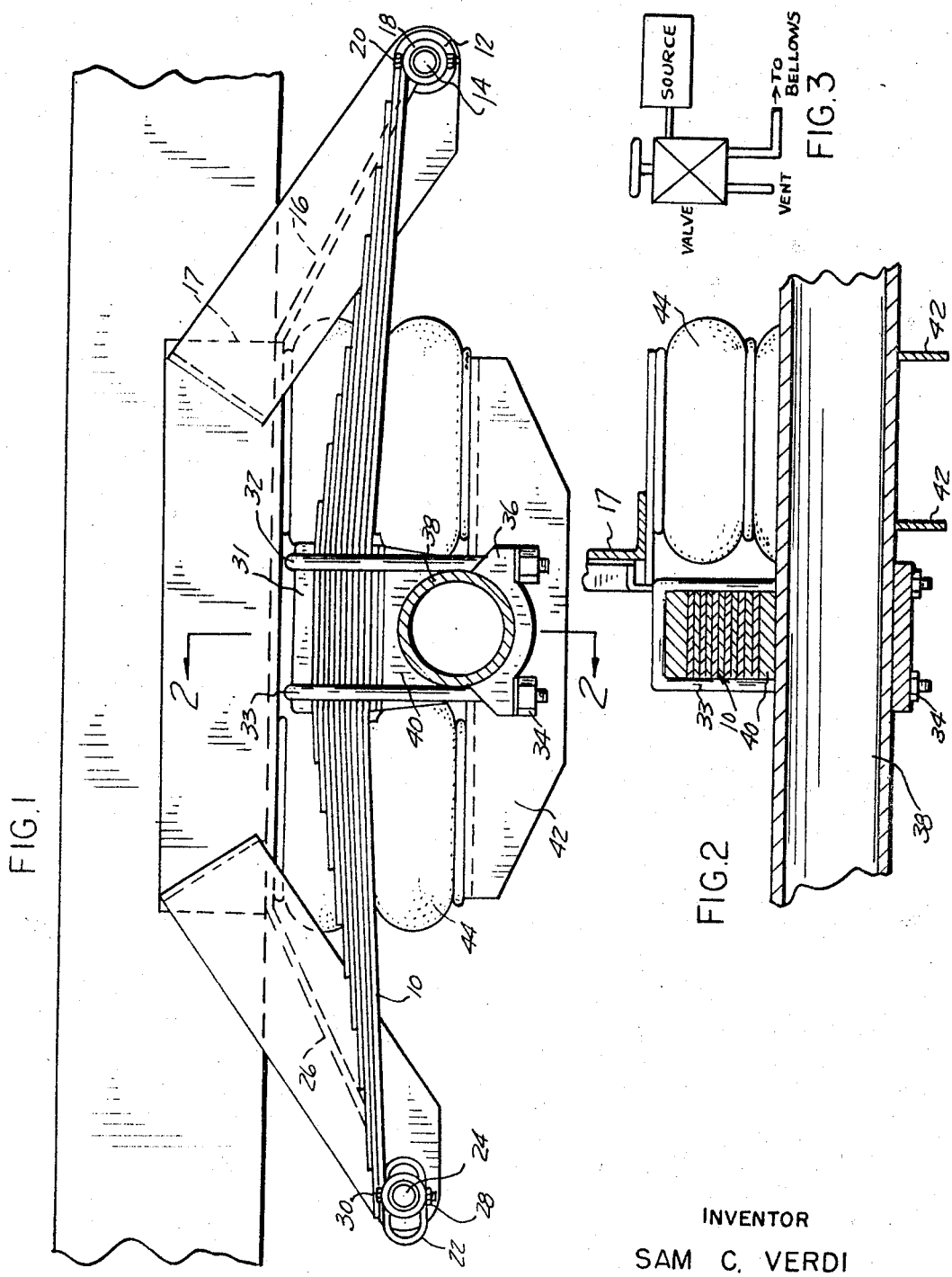

3,448,975
VEHICLE WHEEL SUSPENSION
Sam C. Verdi, Detroit, Mich., assignor to Dura Corporation, Oak Park, Mich.
Filed Oct. 21, 1966, Ser. No. 588,443
Int. Cl. B60g 11/34, 11/46; B62d 61/12
U.S. Cl. 267—31                                    4 Claims

ABSTRACT OF THE DISCLOSURE

This invention relates to a suspension for a motor vehicle. In its preferred embodiment it comprises an upside-down leaf spring urging an axle upwards opposed by air bags rigidly connected to the axle forcing the axle down when inflated into a ground engaging load carrying position.

---

This invention relates generally to suspension for axles of trucks and trailers. More specifically, this invention relates to a suspension for truck or trailer axles in which pneumatic pressure is applied against a downwardly flexed spring carrying the axles of the truck or trailer whereby the pneumatic pressure acts against the spring pressure to force the axle carrying the wheels into a ground engaging position, and upon release of the pneumatic pressure, the spring pressure forces the wheels upwardly into a vertically elevated position leaving a substantial clearance between the wheels and the road.

It is an object of this invention to provide a new and novel suspension system for truck and trailer axles whereby the operator of a motor vehicle can selectively determine the number of axles carrying the load in an uncomplicated efficient system with a considerable saving of weight and cost over prior devices.

It is another object of this invention to provide a suspension system for axles of a truck or trailer or combination thereof whereby a desired number of axles can be placed in a road engaging position to carry an overload legally from one jurisdiction to another where jurisdictions differ in the number of axles required for a given load and the allowable weight on each axle, by prestressing a spring carrying the axle by pneumatic pressure, and reducing the bending moment on the axle.

Other objects of this invention will appear in the following description and appended claims, referring to the accompanying drawings forming a part of this specification.

On the drawings:

FIGURE 1 is a transverse sectional view of the preferred embodiment of this invention;

FIGURE 2 is a cross sectional view of the apparatus illustrated in FIGURE 1;

FIGURE 3 is a diagram illustrating a portion of the pneumatic system used in the preferred embodiment of this invention.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also it is to be understood that the phraseology and terminology employed herein is for the purpose of description and not of limitation.

As shown on the drawings:

In the preferred embodiment of this invention, there is provided a leaf spring member 10. The leaf spring member 10 is made in a manner well known in the art of making springs. It is preferably an elliptic spring designed to carry the load of heavy truck axles. The forward end of the elliptic spring 10 has a loop portion 12 that is essentially circular. It engages a pivot pin 14 which is rigidly secured to a reinforcement member 16. The reinforcement member 16 projects at an acute angle from a frame gusset 17. The loop portion 12 is constrained from sliding off the pin 14 by means of a thrust washer and retaining collar 18. A bolt 20 is provided to secure this collar 18 and passes through the collar 18 and the pin 14.

On the rearward portion of the spring 10 there is provided a slip loop 22. The slip loop 22 is rounded on both ends and is substantially flat in median portions. It is designed to slip with respect to a pin that it surrounds. This pin, designated numeral 24, is rigidly secured to reinforcing bracket 26. The reinforcing member is secured to the frame gusset 17 in a manner similar and symmetrical to the manner in which the reinforcing member 16 is secured to the frame gusset 17. Similarly, the loop portion 22 is prevented from disengaging the pin 24 by means of a thrust washer and retaining collar 28 secured by bolt 30 in a manner similar to and symmetrical to the thrust washer and retaining collar 18 and bolt 20 securing end loop 12.

The loop 22 is so designed that when the spring is in a downward or road engaging position, the forward portion of the interior surfaces of the loop 22 engage the pin 24 and prevent the leaf spring from straining to a distance greater than the fixed distance between pins 24 and 14. When the spring is in an upward or retracted position, the rearward portion of the inner surfaces of the loop 22 engage the pin 24 to prevent a spring head from contracting a distance less than the fixed distance between pins 24 and 14.

The gusset frame member 17 is rigidly secured by means of bolts or rivets to the web and lower flange of the frame of any truck or trailer shown generally in outline form at numeral 27.

A spring cap 31 rests securely against the top of the spring 10. It provides a precise location for U-bolts 32 and 33 with respect to a surface on the leaf spring. The U-bolts 32 and 33 are secured by means of nuts 34 to a bearing cap 36 in order to engage an axle 38 in a manner well known in the art. A spring seat 40 is provided between the axle and the bottom surfaces of the leaf spring 10. This spring seat 40 is rigidly secured to the axle by welding.

A pair of pontoon members 42 are welded to the axle 38. Welding is merely a preferable form of rigid securement. It could be substituted by any other means of rigidly securing one member to another and still be within the scope of my invention.

All of the srtuctural members of this invention i.e., the leaf springs, the gusset frame members, reinforcing members and U-bolts can be made of the steels normally used for these purposes. No special high strength metals are necessary.

Intermediate the gusset frame member 17 and the pontoon members 42 a plurality of air or pneumatic bellows members 44 are provided. These bags are preferably neoprine or nylon cord bags adapted for industrial or truck suspension use. An example of such bellows used in the preferred embodiment of this invention are the air ride or air mount bellows provided by the Firestone Company, Model 22b as described in Firestone Industrial Products catalogue, copyright 1965 by the Firestone Industrial Products Company, Noblesville, Ind. These bellows can be selectively inflated or deflated as described further infra.

When the bellows 44 are deflated, the spring 10 forces the axle 38 into an upward position. This results because without any constraints, the spring 10 resists any downward force up to a very sizeable extent including and exceeding the weight of the axles. However, when air pressure is introduced into the bellows 44 to an extent sufficient to oppose the aforementioned upward force of the leaf springs, the force of the spring is overcome, and the axle is forced by a combination of the weight of the axle and the air pressure in the bellows to a downward or road engaging position.

A pneumatic system described below provides the air pressure or venting of air pressure to the bellows. The system is controlled by a single line control valve that in one position provides a source of high pressure air to the bellows and in another position simultaneously isolates the source of high pressure air from the bellows and also vents the bellows. The valve contains the exhaust port for venting the bellows. This valve in the preferred embodiment of this invention can be any valve that provides the above functions. For example, a Williams 3a valve can be used. The valve is equipped with a dial indicator to indicate the pressure passing through the valve thereby indicating the pressure supplied or maintained in the bellows when in the high pressure source or operating position, as distinguished from the venting and pressure isolation position.

When the wheels upon the axle indicated by numeral 38 are in a road or path engaging or downward or subelevation position, air pressure has been supplied to the bellows and they are in an extended position, forcing the spring into the downward position. When it is desired to retract this axle, the valve is moved by means of a manually activated lever from a high pressure air supplying position to a pressure source isolation and venting position whereby the air or gas is vented from the bellows, the bellows collapse and the force of the spring no longer being constrained by the bellows the spring then moves in an upward position carrying the axle with it to a retracted or upward or elevated position.

It can be appreciated from the foregoing description that a new and useful invention has been originated by me that provides an uncomplicated, efficient and economical means of varying the number of axles carrying the load by truck or trailer by pneumatically forcing an upwardly urged spring downwardly to a predetermined limit and carrying an axle into a wheel engaging road position, and by selectively retracting an axle from a wheel engaging road position to an elevated or retracted position by simultaneously isolating the source of pneumatic pressure and venting gas from pneumatic force means, thus allowing the spring to raise the axle to a predetermined upper limit.

I claim:
1. In apparatus for suspending an axle of a vehicle, the improvement of:
   upwardly urging means;
   means securing an axle of the vehicle rigidly to said upwardly urging means whereby said axle is upwardly urged by said upwardly urging means;
   means operable to exert force opposing upward urging of said upwardly urging means;
   said opposing means, when operated, forcing said axle inot a path engaging and load carrying position;
   said upwardly urging means, when unopposed by said opposing means, raising and disengaging said axle from a path engaging position and preventing it from carrying a portion of the load on the vehicle;
   and means for selectively operating said opposing means;
   said upwardly urging means comprising an elliptical leaf spring;
   said axle being secured to the center of said spring;
   said opposing means exerting force bearing against the center of said spring;
   a bracket member fixed to the frame of said vehicle;
   the ends of said spring being attached to said bracket member;
   a pneumatic system associated with said opposing means and said selectively operating means;
   means limiting the upward travel of said upwardly urging means;
   means limiting the downward travel of said upwardly urging means when said opposing means is operated;
   said opposing means comprising a pontoon member and a pair of bellows inflatable and deflatable by said pneumatic system;
   the geometric center of said pontoon member being rigidly secured to said axle;
   each one of said pair of bellows being secured near one end of said pontoon member and the frame of said vehicle;
   said pontoon member having its ends thereof extending transversely fore and aft of said axle.

2. The apparatus of claim 1 and means rigidly securing said upwardly urging means to the frame of the vehicle at one portion thereof and slideably within mechanical limit members engaging said upwardly urging means on said vehicle at another portion.

3. The apparatus of claim 1 and a pair of pins rigidly secured to the structural frame of the vehicle, a substantially circular loop rigidly secured to said leaf spring and fixing said leaf spring on one of said pins, and a slot defining appendage rigidly fixed to said leaf spring slideably engaging the other of said pair of pins.

4. The apparatus of claim 1 wherein said opposing means comprises bellows and said selectively operating means comprises a pneumatic system selectively operable to inflate said bellows to oppose the downward motion of said upwardly urging means and deflate said bellows by ventilation while isolating said bellows from a source of pneumatic pressure in deoperating said opposing means from opposing the upward travel of said upwardly urging means.

References Cited
UNITED STATES PATENTS

| 3,031,179 | 4/1962 | Peirce | 267—65 |
| 3,066,929 | 12/1962 | Gregoire | 267—65 |
| 3,201,141 | 8/1965 | Bernstein et al. | 180—22 |
| 3,224,522 | 12/1965 | Fleming | 180—22 |
| 3,271,077 | 9/1966 | Timmer et al. | 200—43.23 X |

ARTHUR L. LA POINT, *Primary Examiner.*

CHARLES B. LYON, *Assistant Examiner.*

U.S. Cl. X.R.
280—43